United States Patent

[19]

Wu

[11] Patent Number: 6,052,640

[45] Date of Patent: Apr. 18, 2000

[54] AUTOMOTIVE TORQUE CONVERTER SLIP ESTIMATION

[75] Inventor: Peter E. Wu, Farmington Hills, Mich.

[73] Assignee: General Motors Corporation, Detroit, Mich.

[21] Appl. No.: 08/971,023

[22] Filed: Nov. 14, 1997

[51] Int. Cl.[7] .................................................. B60K 41/18
[52] U.S. Cl. .................................. 701/67; 701/87; 701/90
[58] Field of Search ................................. 701/54, 67, 68, 701/84, 87, 90; 477/107, 115; 74/337

[56] References Cited

U.S. PATENT DOCUMENTS

| | | | |
|---|---|---|---|
| 4,180,978 | 1/1980 | Maddock | 60/345 |
| 4,535,412 | 8/1985 | Cederquist | 701/68 |
| 4,843,918 | 7/1989 | Morimoto | 74/866 |
| 5,417,621 | 5/1995 | Tibbles | 477/39 |

*Primary Examiner*—Tan Nguyen
*Attorney, Agent, or Firm*—Michael J. Bridges

[57] ABSTRACT

Slip across a torque converter of an automotive powertrain is estimated using powertrain operating parameters throughout a powertrain operating cycle for use in powertrain control and diagnostic operations. Slip across the torque converter is estimated and is periodically updated in accordance with an adaptive control procedure to maintain model accuracy over time. The slip is estimated for both torque converter coupling and torque multiplication scenarios, with the greater of the estimates identified as indicating current slip. Current slip is applied to generate actual transmission gear ratio which is compared to commanded gear ratio when a transmission shift maneuver is not in process to identify transmission solenoid fault conditions, and which is applied for precise transmission shift enhancement control during a transmission shift maneuver.

12 Claims, 4 Drawing Sheets

AUTOMOTIVE TORQUE CONVERTER SLIP ESTIMATION

TECHNICAL FIELD

This invention relates to automotive powertrain operation and, more particularly, to powertrain control and diagnostics through estimation of slip across a torque converter.

BACKGROUND OF THE INVENTION

Automotive internal combustion engines are known to be coupled to transmissions through hydrodynamic converters which provide torque multiplication and hydrodynamic damping benefits. Hydrodynamic converters, also commonly referred to as torque converters, include a driving member or pump coupled to an engine output shaft and a driven member or turbine coupled to a transmission input shaft. A hydraulic coupling is provided between the driving and driven members. The torque multiplication and damping characteristic of the torque converter varies with the slip between the driving and driven members which is defined as the difference in rotational speed between the two members. In a torque multiplication region of torque converter operation, the slip is relatively high. In a coupling region of torque converter operation, slip is relatively low. The region of operation of the torque converter is dictated by engine operating conditions, and may be difficult to predict under transient operating conditions. Accordingly, torque converter slip may be difficult to predict under transient operating conditions.

More specifically, while the rate of rotation of the torque converter driving member, which is coupled to the engine output shaft, may be known, and while the rate of rotation of the transmission output shaft may be known using conventional sensor mechanizations, the transmission input shaft speed is not known with precision during certain transient operating conditions. This lack of precision can lead to reduced powertrain transient control precision and reduced powertrain diagnostic coverage.

Transmission input shaft speed sensors are known to be coupled to an automotive vehicle drivetrain to transduce the rate of rotation of the input shaft of the transmission into a signal applied for powertrain control and diagnostics. Such sensors provide transmission input shaft rate of rotation information which, when coupled with other available information, indicate slip across the torque converter. However, such sensors and their corresponding wiring and circuitry add significantly to the cost and complexity of powertrain control and diagnostics. Typically such sensors take the form of Hall effect, variable reluctance, or magnetoresistive transducers positioned adjacent a series of teeth or notches machined into or coupled to the transmission input shaft for transducing passage of the teeth or notches by the transducer into a predictable change in a transducer output signal. The output signal is sampled by analog to digital conversion circuitry which outputs a digital representation of the transducer output for use by a digital control in carrying out control and diagnostics operations.

It would be desirable to provide accurate torque converter slip information for use in powertrain control and diagnostics without the substantial cost and complexity associated with use of conventional transmission input shaft speed transducers.

SUMMARY OF THE INVENTION

The present invention is directed to estimating slip across a torque converter of an automotive powertrain without the cost and complexity involved in use of transmission input shaft speed transducer hardware, without compromising control and diagnostic precision. More specifically, a model for accurately estimating slip across the torque converter is provided which applies throughout the regions of operation of the torque converter. The model is updated through an adaptive procedure to account for modeling errors that may result from system variation over time, through comparison of the estimated slip to a known slip, when available, to generate slip error which is gradually reduced toward zero.

In accord with a further aspect of this invention, a model is provided for accurately estimating slip across the torque converter in each of a coupling region of operation and a torque multiplication state of the torque converter. The model is periodically applied to generate two slip estimates. The two estimates are compared and the greater of the two taken as current torque converter slip. The region associated with the greater of the two slip estimates is assumed to be the current active torque converter region.

In accord with a further aspect of this invention, the current torque converter slip is applied when a transmission gear change is assumed to not be in process, to diagnose transmission solenoid fault conditions which result in a deviation away from a commanded state of the transmission. The current torque converter slip is applied to generate actual transmission gear ratio which is compared to a commanded gear ratio. The result of the comparison is used to generate, over a number of compares, a pattern. If the pattern, once updated, corresponds to a pattern consistent with a transmission solenoid fault condition, a fault is diagnosed and indicated.

In accord with a further aspect of this invention, the current torque converter slip is applied in powertrain controls to enhance transmission shift quality. More specifically, the slip is applied to generate, during a transmission gear change operation, transient gear ratio which is compared to at least one gear ratio range. When the transient gear ratio is within a predetermined range, shift control operations are carried out to enhance the shift, including operations to retard engine ignition timing to reduce engine output torque to "soften" the shift, operations to vary transmission line pressure to enhance shift smoothness, and operations to time the shift so that deviations in shift response away from a target response may be compensated in future shift operations.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
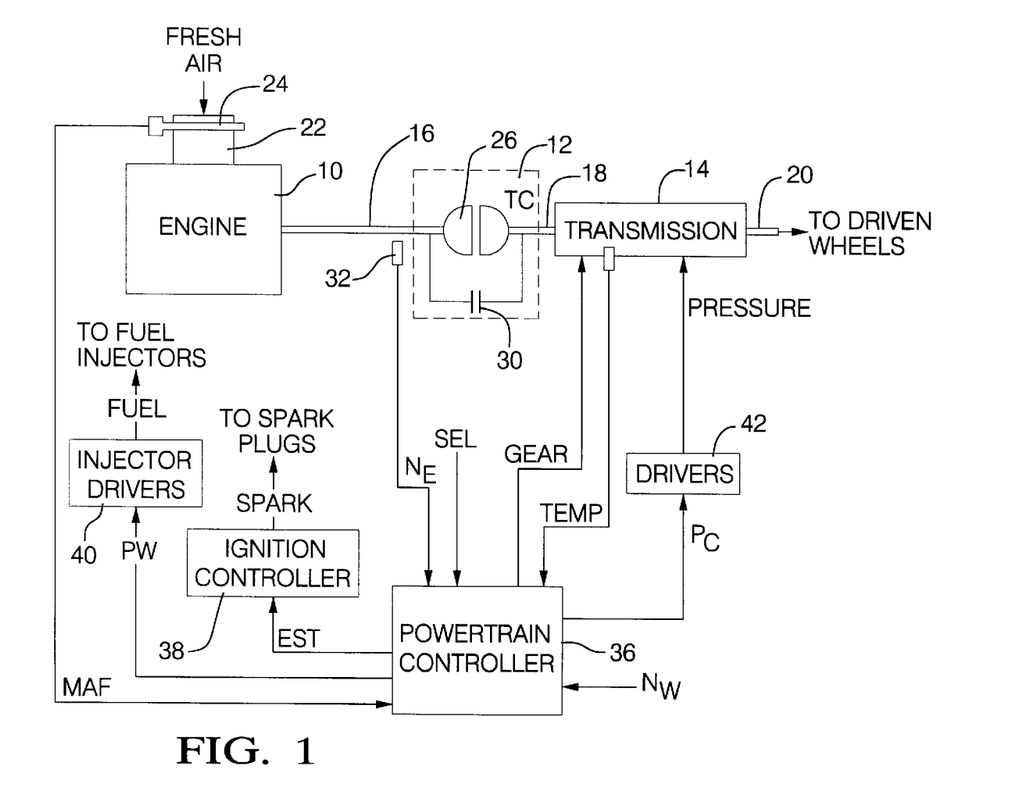
FIG. 1 is a general diagram of an automotive powertrain and powertrain control hardware for carrying out the principles of this invention in accordance with the preferred embodiment.

Referring to FIG. 1, internal combustion engine 10 receives fresh intake air through intake air passage 22 past conventional mass airflow sensor 24 of the hot wire or thick film type for mixing with an injected fuel charge and admission to engine cylinders (not shown) for combustion therein under a spark plug ignition event. The mass airflow sensor 24 transduces the mass flow of air passing thereby into output signal MAF. The cylinder combustion process drives pistons (not shown) which are linked to an engine output shaft 16 in the form of a crankshaft to rotationally drive the crankshaft. A series of spaced teeth or notches are disposed about a rotating body (not shown), such as a wheel, secured to the crankshaft 16 for rotation therewith. A sensor 32 of the conventional variable reluctance, Hall Effect, or magnetoresistive type is fixed in position relative to the rotating body in proximity thereto to transduce passage of the teeth or notches thereby into predictable variations in a transducer output signal $N_E$, with the frequency of such signal being proportional to engine speed (rate of rotation of the shaft 16).

The output shaft 16 is mechanically linked to a driving member 26 (also referred to as a pump) of a conventional torus vessel 12 (also referred to herein as a torque converter). A driven member 28 (also referred to as a turbine) of the torus vessel 12 is hydrodynamically linked to the pump 26 to be driven thereby, and further is mechanically linked to a transmission input shaft 18. The torus vessel, as is well-recognized in the art to which this invention pertains, provides a hydrodynamic coupling between the engine 10 and a transmission 14 providing well-known torque multiplication and hydrodynamic damping benefits. An electronically controlled torque converter clutch 30 is provided across the torus vessel 12 for selectively fixedly engaging the output shaft 16 with the transmission input shaft 18 to bypass, under certain well-known powertrain operating conditions, the hydrodynamic coupling thereof in accordance with generally understood powertrain control principles.

Transmission input shaft 18 is coupled to transmission 14 of any suitable conventional automatic electronic type for coupling torque between input shaft 18 and a transmission output shaft 20 through a selected one of a plurality of fixed gear ratios. The transmission output shaft 20 is coupled to driven wheels of an automotive vehicle (not shown). Temperature transducer 34 in the form of a conventional thermocouple or thermistor is disposed within a transmission sump (not shown) to transduce the temperature of conventional transmission fluid within the sump into output signal TEMP.

Powertrain controller 36 takes the form of a conventional single chip microcontroller having such well-known elements as a central processing unit, read only memory devices, random access memory devices, and input/output devices. The powertrain controller 36 receives and periodically samples such input signals as MAF, $N_E$, TEMP, at least one transduced wheel speed $N_W$, from at least one corresponding conventional wheel speed sensor (not shown), and a signal SEL indicating a manually selected transmission gear ratio, and generates and issues actuator commands for carrying out powertrain control and diagnostics in accordance with this invention.

More specifically, a signal PW indicating a desired fuel injection pulsewidth is generated through execution of fuel control procedures and is issued to fuel injector drivers taking the form of high current drivers which issue injector drive commands FUEL to active fuel injectors in accordance with conventional fuel scheduling. Likewise, a signal EST indicating a desired ignition timing is generated by the powertrain controller 36 through execution of spark timing control procedures and is issued to an ignition controller 38 which takes the form of suitable conventional spark plug drive circuitry for outputting a spark plug drive signal SPARK to an active spark plug to ignite an air-fuel mixture in an active engine cylinder in accordance with generally-understood engine control operations. The timing of the issuance of the signal SPARK is dictated by the ignition timing command. As is generally understood in the art to which this invention pertains, engine output torque may be reduced by retarding the ignition timing. Transmission solenoid select signal GEAR is a transmission control signal issued by the PCM 36 in the form of a pair of binary select signals for activating a desired transmission gear. Pressure control signal Pc is issued by the PCM 36 for controlling hydraulic line pressure in the transmission. In addition to the aforementioned control operations, further operations for controlling and diagnosing powertrain systems and components are carried out by the powertrain controller including the operations detailed in a step by step manner in FIGS. 2–5.

Figure 2:
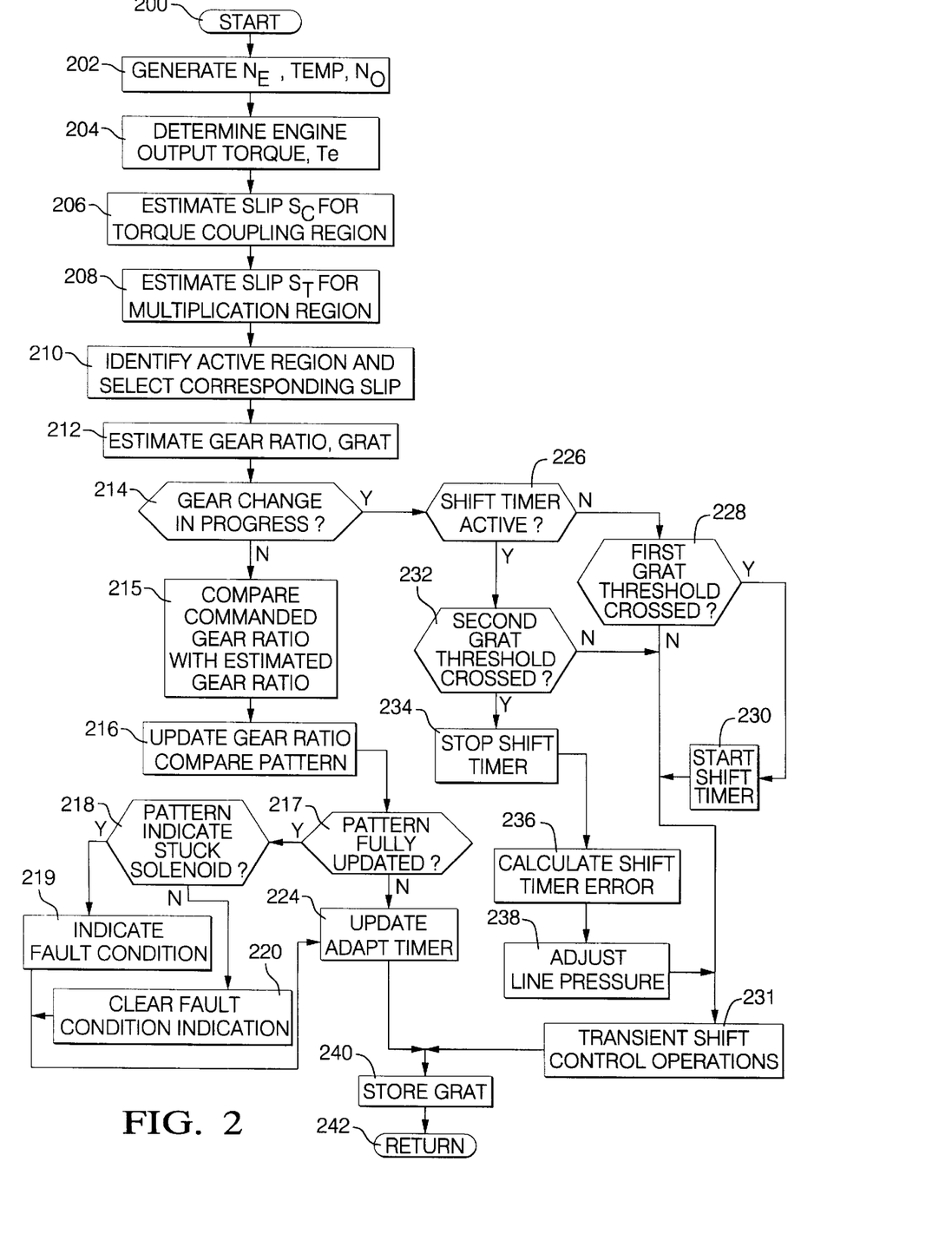
FIGS. 2–5 are flow diagrams illustrating a flow of operations of the hardware of FIG. 1 for carrying out the principles of this invention.

Referring to FIG. 2, a series of operations for periodically modeling rate of rotation of the transmission input shaft 18 of FIG. 1 and for accurately estimating slip across the torus vessel 12 in accordance with this invention are illustrated. Such operations are carried out in a step by step manner by the powertrain controller approximately every twenty-five milliseconds while the powertrain controller is in normal operation, such as while a vehicle operator provides for application of ignition power to the powertrain controller, for example through manual rotation of an ignition key to an "ON" position. The operations of FIG. 2, in accordance with an important aspect of this invention, apply the modeled transmission input shaft speed value in powertrain control and diagnostics operations.

More specifically, the operations of FIG. 2 are initiated at a step 200 upon occurrence of a conventional timer-based controller interrupt, and proceed from the step 200 to generate current engine speed $N_E$, transmission sump temperature TEMP, and transmission output shaft rate of rotation $N_O$ values at a step 202. Current engine speed $N_E$ is generated directly from the frequency of signal $N_E$ of FIG. 1, TEMP is a digital representation of at least one sample of signal TEMP of FIG. 1, and transmission output shaft rate of rotation $N_O$ may be determined, under steady state transmission operating conditions, as directly proportional to at least one sample of the wheels speed signal $N_W$ of FIG. 1. Engine output torque Te is next generated at a step 204 through any suitable conventional torque model, such as a model generating engine output torque as a function of engine speed, fuel pulse width PW, ignition timing EST, and mass airflow rate MAF. Slip $S_C$ across the torque converter is next estimated under an "open-loop" assumption that the torque converter 12 of FIG. 1 is operating in a coupling region in which the torque converter clutch may be engaged and a relatively small slip is present between the driving member 26 and the driven member 28 thereof as follows:

$$S_C = K * \left(\frac{T_e}{N_E}\right)$$

in which K is a calibrated coupling gain.

Figure 3:
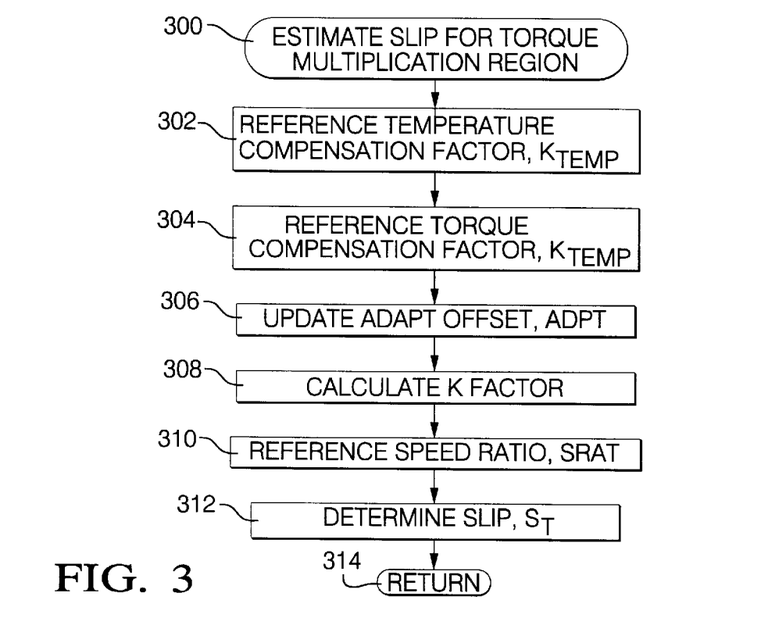

After determining $S_C$ at the step 206, slip $S_T$ across the torque converter is next estimated at a step 208 under an "open-loop" assumption that the torque converter 12 of FIG. 1 is operating in a torque multiplication region in which the torque converter clutch is not engaged and substantial slip is present between the driving member 26 and the driven member 28 thereof by executing the operations of FIG. 3.

Figure 6:
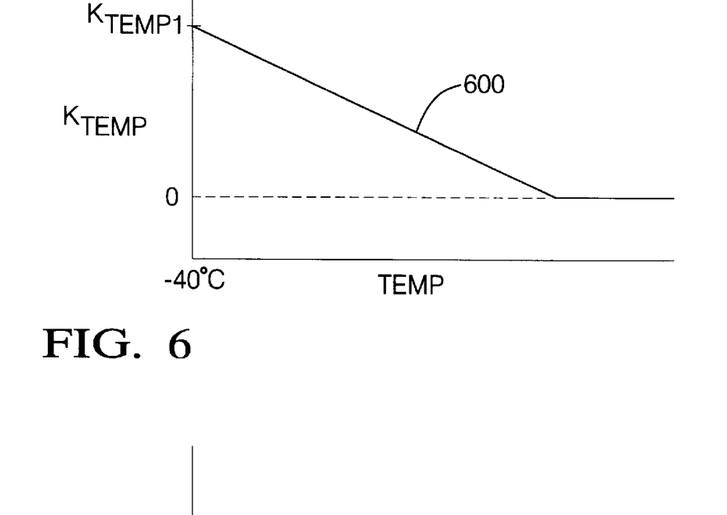
FIGS. 6–8 are two-dimensional parameter diagrams illustrating parameter relationships referenced in the operations of FIGS. 2–4.

Referring to FIG. 3, operations for modeling a performance characteristic of the torque converter 12 of FIG. 1, including modeling torque converter stiffness under current operating conditions, are illustrated in a step by step manner, beginning at a step 300 and proceeding, at a next 302, to reference a stored temperature compensation factor $K_{TEMP}$ which, in this embodiment, is an offset determined, through a conventional calibration process, as a function of transmission fluid temperature TEMP, as illustrated by curve 600 of FIG. 6. The increase in torque converter stiffness with decreasing transmission fluid temperature is characterized in the decreasing $K_{TEMP}$ magnitude with temperature of curve 600 from an initial value, $K_{TEMP1}$, at a minimum temperature of −40 degrees Celsius to a $K_{TEMP}$ value of zero at a substantially warmed up fluid temperature.

Figure 7:
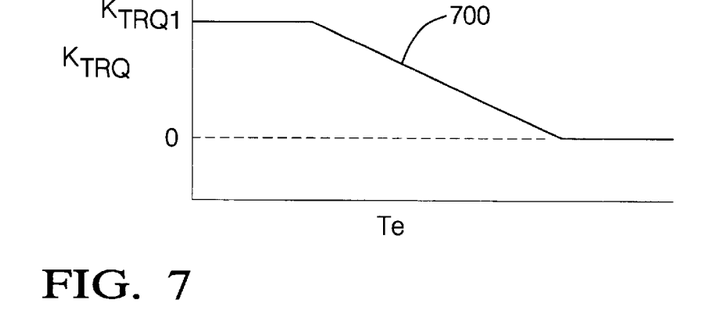

The calibrated relationship between $K_{TEMP}$ and TEMP may be stored in the form of a conventional lookup table with a current TEMP value applied, at the step 302 of FIG. 3, to the table to retrieve a corresponding $K_{TEMP}$ value, as is known in the art to which this invention pertains. Following the step 302, a torque compensation factor, $K_{TRQ}$, is next referenced at a step 304 from a calibrated stored lookup table, which may generally be formed and stored in the manner described for the table described at the step 302. $K_{TRQ}$ represents an offset which accounts for the variation in torque converter 12 (FIG. 1) stiffness with varying engine output torque Te. A representative calibrated relationship between $K_{TRQ}$ and engine output torque is illustrated in curve 700 of FIG. 7, which provides for a maximum offset, $K_{TRQ1}$, for low engine output torque, with $K_{TRQ}$ decreasing toward zero with increasing engine output torque. A current engine output torque estimate is applied to a conventional lookup table having entries of (Te, $K_{TRQ}$) pairs, with the corresponding $K_{TRQ}$ value retrieved from the table using wellknown interpolation processes. After referencing $K_{TRQ}$, an adapt offset ADPT is updated at a next step 306 through execution of the operations of FIG. 5, which vary the value of ADPT in accordance with an assessed accuracy of the transmission input shaft speed estimate of this embodiment.

Figures 4, 5:
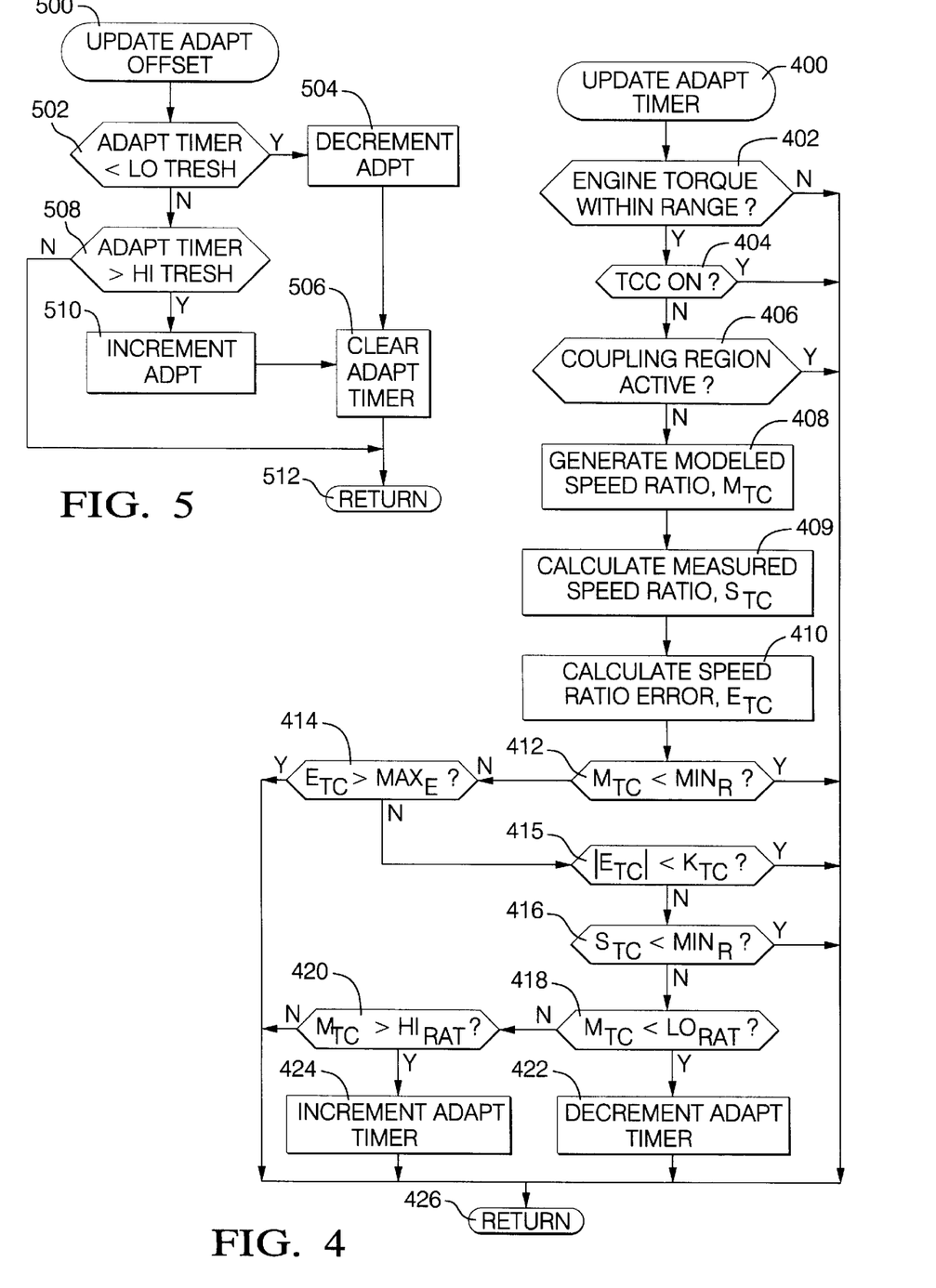

Referring to FIG. 5, the operations to update ADPT are initiated at a step 500 and proceed to compare an adapt timer, indicating a detected, correctable input shaft speed modeling error, to be described, to a calibrated low timer threshold LOTHRESH at a next step 502. If the adapt timer is less than LOTHRESH, a negative speed ratio error is persistent and is adapted for by decreasing ADPT at a next step 504, after which the adapt timer is cleared at a next step 506 to prepare for a re-evaluation of the accuracy of the input shaft speed model. Returning to step 502, if the adapt timer is not less than LOTHRESH, it is compared to a calibrated high timer threshold HITHRESH at a next step 508. HITHRESH is calibrated to indicate a tolerance of overspeed error in the input shaft speed estimate of this embodiment. If adapt timer exceeds HITHRESH, corrective action is desired to reduce the overspeed error, and is provided by increasing ADPT at a next step 510, after which the adapt timer is cleared at the step 506.

Following the step 506, the operations to update the adapt offset are concluded and return, via a next step 512, to resume execution of the operations of FIG. 3, at a next step 308 at which a performance factor indicating torque converter 12 (FIG. 1) stiffness, termed "K factor" is calculated as follows:

$$Kfactor = \frac{N_E}{\sqrt{Te}} + ADPT + K_{TEMP} + K_{TRQ}.$$

A characteristic torque converter 12 (FIG. 1) speed ratio indicating, for the current operating conditions, the speed ratio between the input and output shafts of the torque converter, such as shafts 16 and 18, is next referenced as a function of Kfactor at a next step 310 using a characteristic curve for the specific torque converter 12 (FIG. 1), such as may commonly be provided by the torque converter manufacturer.

Figure 8:
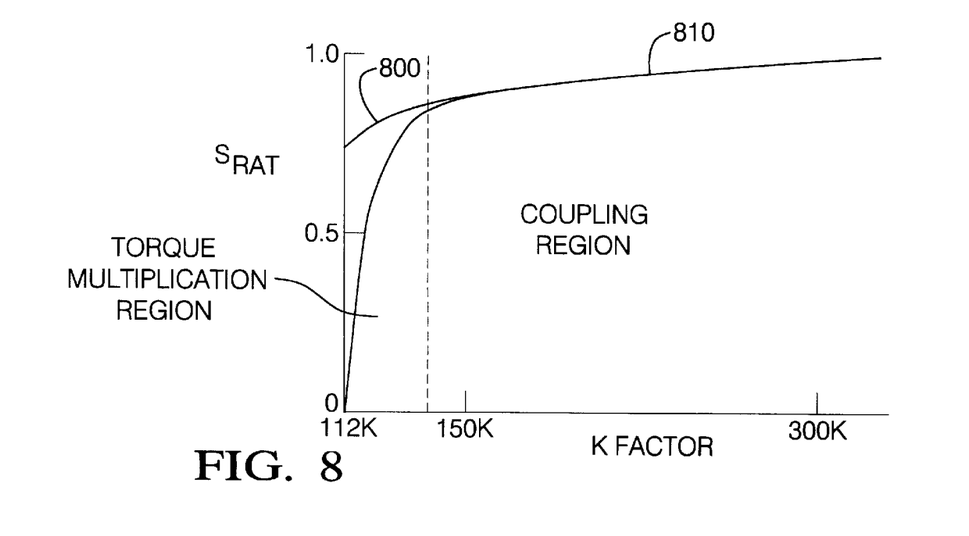

A representative characteristic curve is illustrated as curves 800 and 810 of FIG. 8 with curve 800 describing a specified speed ratio-Kfactor relationship for the torque multiplication region of operation of the torque converter 12 (FIG. 1) and the curve 810 describing such as relationship for the coupling region of operation. As generally described for the FIGS. 6 and 7, the characteristic curve of FIG. 8 may be stored in the form of a conventional lookup table with pairs of points selected from the curves 800 and 810 and stored together with current Kfactor applied to the stored table to retrieve a corresponding speed ratio value, for example through a conventional interpolation process. After referencing a current speed ratio Srat from the stored lookup table at the step 310, slip $S_T$ across the torque converter 12 (FIG. 1) under assumed torque multiplication conditions is calculated at a next step 314 as follows:

$$S_T = (1 - Srat) * N_E.$$

After determining $S_T$, the operations of FIG. 3 are concluded by returning, via a next step 314, to the operations of FIG. 2, at which a next step 210 is executed to identify whether the coupling or the torque multiplication region is currently assumed to be active and to select as "active" the calculated slip corresponding to the active region. In this embodiment, the active region is the region having a higher calculated slip. According, $S_T$ and $S_C$ are compared at the step 210 and the higher of the two slip values selected as "active" and the region corresponding to the active slip is determined to be the active region. A current gear ratio GRAT is next estimated using the active slip value, at a step 212, as follows:

$$GRAT = (N_E - ACTIVE\ SLIP)/N_O$$

in which ACTIVE SLIP is the greater of the current estimates of $S_T$ and $S_C$, as described.

The estimated gear ratio GRAT, provided through an accurate estimate of transmission input shaft speed without the cost and complexity of an added input shaft speed transducer in accordance with a critical aspect of this invention, may be used in powertrain control and diagnostics operations, such as the operations illustrated by steps 214–242. Such operations provide for diagnosis of operability of certain transmission components and for improvement of powertrain performance. More specifically, such operations begin by determining whether a transmission gear change is in process at a step 214. A gear change is in process in this embodiment when a gear change has been requested and is not yet complete. If a gear change is determined to be in process at the step 214, steps 226–238 are executed to determine whether shift enhancement is required to maintain high shift quality, by first determining whether a shift timer is active at a step 226. The shift timer is provided to time a gear ratio transition between a calibrated first and a calibrated second ratio. More specifically, for each transmission gear transition, two ratio thresholds are defined, such as about ten percent and about ninety percent of the gear ratio difference between the current gear ratio and the destination gear ratio under the current gear transition process, and the shift timer is used to asses the time required to pass between the two ratios. If the time required exceeds a calibrated upper limit, transmission line pressure is increased through increase in pressure command Pc of FIG. 1 to reduce overall shift time. If the time required is less than a calibrated lower limit, the pressure command is decreased. Such provides for high performance transmission shift control over time and over change in operating conditions.

Returning to FIG. 2, if the shift timer is determined to not be active at the step 226, GRAT is next compared to a first gear ratio threshold between the current gear and the destination gear under the current gear change process at a step 228. If GRAT equals or exceeds (crosses) the first gear ratio, the shift timer is started from zero at a next step 230. After starting the shift timer, or if GRAT did not cross (was determined to be less than) the first gear ratio at the step 228, then further transient shift control operations may be carried out at a step 231 including, for example, operations to gradually increase transmission line pressure at the start of a transmission shift transient and to gradually reduce line pressure during the last portion of a shift transient to increase shift smoothness, and to retard ignition timing command (EST) during the shift transient to reduce the amount of energy which a shift clutch must absorb during the shift. The timing for varying transmission hydraulic line pressure and ignition timing are provided in this embodiment by comparing the estimated gear ratio GRAT as determined at the step 212 to calibrated ratio thresholds and by carrying out control operations when such thresholds are crossed. After concluding such additional control operations at the step 231, GRAT is next stored at a step 240, and the operations of FIG. 2 are concluded by returning, via a next step 242, to execute any controller operations that may have been suspended to allow for execution of the operations of FIG. 2 following occurrence of the described timer interrupt.

Returning to step 226, if the shift timer is determined to be active, GRAT, as determined at the step 212, is next compared to the second gear ratio at a step 232 to determine if GRAT exceeds the second gear ratio threshold. If the second gear ratio is not exceeded by GRAT, the described step 231 is executed. However, if the second gear ratio is determined to be exceeded at the step 232, the shift timer is stopped at a next step 234, and a shift timer error is calculated at a next step 236 as a difference between the shift timer and a calibrated ideal shift transition time. Line pressure in the transmission is next adjusted to drive shift timer error toward zero in a controlled manner at a step 238, for example by adjusting, through a pre-selected control function, a change in the command Pc of FIG. 1 that will drive shift time between the two gears of the current gear change process toward a desired shift time in a manner generally known in the art to which this invention pertains. Following any required adjustment in line pressure at the step 238, the described step 231 is executed followed by the described steps 240 and 242 to conclude the operations of FIG. 2.

Returning to step 214, if a gear change is determined to not be in process, such that the transmission gear ratio is substantially fixed, a transmission diagnostic for diagnosing any fault conditions in transmission shift solenoids is carried out via steps 215–220. The diagnosed fault conditions of this embodiment diagnose whether any condition is present resulting in a solenoid stuck open or stuck closed condition.

These operations begin by comparing a current commanded gear ratio with the estimated gear ratio GRAT at a step 215. A gear ratio compare pattern is next updated at a step 216 with the result of the comparison of the commanded and estimated gear ratios. The gear ratio compare pattern takes the form of a stored array of the results of the comparison of step 215 for each gear of the transmission. For example, if the current commanded gear matches the estimated gear ratio GRAT, a "match" flag will be stored for the current commanded gear in the array. If the GRAT corresponds to a gear other than the current commanded gear at the step 215, a fault flag will be stored in the array indicating the nature of the mismatch. The array will, when fully updated to indicate the result of all commanded gear ratios, indicate, through the stored flags, whether either of the solenoids are stuck in an open or a closed state. The pattern of flags within the array that indicates such solenoid conditions, may be readily generated from the relationship of the solenoids and the commanded transmission gears for a specific application.

More specifically, after updating the gear ratio compare pattern at the step 216, a check is made at a next step 217 as to whether the pattern is fully updated. The pattern is fully updated in this embodiment when all gears of the transmission have been commanded and the compare of step 215 made for each commanded gear. Once the pattern is determined to be fully updated at the step 217, the pattern is analyzed at a step 218 to determine if the flags of the pattern indicate a solenoid stuck condition. If the pattern indicates such a fault condition, the fault condition is indicated at a next step 219, for example by storing a fault code in a conventional non-volatile memory device of the controller 36 (FIG. 1), and/or by illuminating a lamp visible to the operator of the powertrain in any suitable conventional manner, to facilitate timely treatment of the fault condition. Returning to step 218, if the flags of the pattern indicate no such fault condition, for example because GRAT substantially matched the commanded gear ratio for each commanded gear, then the fault condition indication is cleared at a next step 220. Following steps 219 and 220, or if the pattern is determined to not be fully updated at the step 217, a step 224 is executed to update an adapt timer by carrying out the operations of FIG. 4 in a step by step manner.

Referring to FIG. 4, operations to adapt for persistent speed ratio error to correct for modeling errors are carried out in a step by step manner beginning at a step 400 and proceeding to determine if a plurality of speed ratio error test conditions are met through steps 402–416. The speed ratio error test conditions are required to be met in this embodiment to ensure that any speed ratio error is attributable to modeling error and not other operating conditions or perturbations. More specifically, a first test condition, that engine output torque Te be within a predetermined torque range, is checked at a step 402. A representative torque range may be calibrated as residing between 130 Nm and 250 Nm in this embodiment as determined through a conventional calibration procedure.

If Te is determined to be within the predetermined torque range, then such condition is met and a next test condition, that the torque converter clutch TCC 30 (FIG. 1) is not currently engaged ("on"), is then checked at a step 404. If the TCC is not currently engaged, such condition is met and a next condition, that the coupling region is not currently active, is checked at a next step 406. The coupling region, characterized by low slip across the torque converter 12 (FIG. 1), is determined to be active at the described step 210 of FIG. 2. If the coupling region is determined to not be active at the step 406, such condition is met and a modeled speed ratio MTC is next generated at a step 408 as follows:

$$M_{TC}=(N_E-\text{ACTIVE SLIP})/N_E.$$

A measured speed ratio $S_{TC}$ is next calculated at a step 409 as follows:

$$S_{TC}=(N_O*\text{GEARRATIO})/N_E.$$

A torque converter speed ratio error $E_{TC}$ is next determined as a simple difference between $S_{TC}$ and $M_{TC}$ at a step 410. Following the step 410, estimated speed ratio $M_{TC}$ is compared to a minimum speed ratio $MIN_R$ which may be determined through a conventional calibration procedure as the speed ratio threshold below which speed ratio error should not be adapted. If $M_{TC}$ is determined to not be less than $MIN_R$ at the step 412, then a further condition is met and a next conditions, that $E_{TC}$ not exceed a maximum calibrated error threshold $MAX_E$ above which errors are assumed to be beyond the range the current adaptive control can effectively compensate. If $E_{TC}$ does not exceed $MAX_E$ as determined at a step 414, the condition is met and a next condition, that the magnitude of $E_{TC}$ exceed a deadband defined by a calibrated minimum error $K_{TC}$ is examined at a next step 415. $K_{TC}$ defines a range of speed ratio errors not requiring, due to their relatively small magnitude, and adaptive compensation in this embodiment. If the magnitude of $E_{TC}$ does not exceed $K_{TC}$ as determined at the step 415, the condition is met and a next condition, that the measured speed ratio $S_{TC}$ exceed the minimum speed ratio threshold $MIN_R$ is examined at a next step 416. $MIN_R$, as described for the step 412, is a minimum speed ratio threshold below which speed ratio error should not be adapted. Accordingly, if $S_{TC}$ is not less than $MIN_R$ as determined at the step 416, the condition is met and all conditions required to be present before the adapt timer may be updated in this embodiment are met. Accordingly, the adapt timer is next updated through steps 418–424.

More specifically, if the estimated speed ratio $M_{TC}$ is below a calibrated low speed ratio $LO_{RAT}$, as determined at a next step 418, then the adapt timer is decremented at a next step 422. If $M_{TC}$ is not below $LO_{RAT}$, then it is compared to a calibrated high ratio $HI_{RAT}$ at a next step 420. If $M_{TC}$ exceeds $HI_{RAT}$ at the step 420, the adapt timer is incremented at a next step 424.

After the steps 422 and 424, or if the speed ratio $M_{TC}$ is not greater than $HI_{RAT}$ at the step 420, or if any of the conditions of steps 402–406 and steps 412–416 are determined to not be met, then the operations of the routine of FIG. 4 are concluded by returning, via a next step 426, to the operations of FIG. 2 at the step 224. Returning to FIG. 2, after updating the adapt timer at the step 224, the described steps 240 and 242 are executed to conclude the operations of FIG. 2.

The preferred embodiment is not intended to limit or restrict the invention since many modifications may be made through the exercise of ordinary skill in the art without departing from the scope of the invention.

The embodiments of the invention in which a property or privilege is claimed are described as follows.

I claim:

1. A method for estimating a difference in a rate of rotation of a driving member and a driven member of a torque converter of an automotive powertrain, the driving member coupled to an engine output shaft and the driven member coupled to a transmission input shaft, comprising the steps of:

estimating torque delivered to the driving member from the engine output shaft;

estimating the rate of rotation of the engine output shaft;

retrieving a stored slip correction value;

estimating the difference in the rate of rotation as a function of the slip correction value and of the rate of rotation divided by the square root of the estimated torque;

generating a transmission gear ratio as a function of the estimated difference;

measuring actual transmission gear ratio while a transmission gear change is not in process;

calculating a gear ratio error as a function of a difference between the generated transmission gear ratio and the actual transmission gear ratio;

updating the slip correction value in direction to drive the gear ratio error toward zero.

2. The method of claim 1, wherein the torque converter operates in one of a coupling region and a torque multiplication region, the method further comprising the steps of:

generating an additional difference in the rate of rotation in accordance with a coupling region estimation process;

comparing the additional difference in the rate of rotation with the first recited difference in the rate of rotation; and establishing a current difference in the rate of rotation of the driving and driven members as the greater of the first recited and additional differences in the rate of rotation.

3. The method of claim 1, wherein transmission gear change is controlled through control of the state of shift solenoids, the method further for diagnosing shift solenoid fault conditions, further comprising the steps of:

identifying when a transmission gear change is not in process; and diagnosing fault conditions of the shift solenoids when a transmission gear change is not in process, by repeatedly (a) updating the determined difference, (b) determining current transmission gear ratio as a function of the updated determined difference, (c) identifying a pattern of deviation of the determined current transmission gear ratio away from an expected gear ratio, and (d) diagnosing the fault condition when the identified pattern substantially matches a predetermined pattern consistent with a solenoid fault condition.

4. The method of claim 1, further for powertrain control during a transmission gear change maneuver in response to the determined difference, the method further comprising the steps of:

identifying when a transmission gear change is in process;

periodically updating the determined difference while the transmission gear change is in process;

identifying when the updated determined difference is within a predetermined difference range; and varying powertrain control commands in accordance with predetermined control command variations while determined difference is within the predetermined difference range.

5. A method for estimating slip across a torque converter having a driving member coupled to an engine output shaft and a driven member coupled to an input shaft of a transmission, the transmission having an output shaft coupled to driven wheels of an automotive vehicle, comprising the steps of:

estimating torque applied to the torque converter;

estimating rate of rotation of the engine output shaft;

generating the slip estimate as a function of the estimated rate of rotation divided by the square root of the estimated torque;

determining when a transmission gear change is not in process;

calculating current rate of rotation of the transmission input shaft by reducing the rate of rotation of the engine output shaft by the slip estimate when the transmission gear change is not in process;

estimating a rate of rotation of the transmission output shaft;

calculating current transmission gear ratio as a function of the calculated rate of rotation of the transmission input shaft and the estimated rate of rotation of the transmission output shaft;

generating a gear ratio error as a difference between the current gear ratio and an expected gear ratio; and adapting a slip estimation offset in direction to drive the gear ratio error toward zero;

and wherein the step of generating the slip estimate generates the slip estimate as a function of the adapted slip estimation offset and of the estimated rate of rotation divided by the square root of the estimated torque.

6. A method for estimating slip across a torque converter operating in one of a torque multiplication region and a coupling region and having a driving member coupled to an engine output shaft and a driven member coupled to a transmission input shaft, comprising the steps of:

estimating torque applied to the torque converter;

estimating rate of rotation of the engine output shaft;

generating the slip estimate as a function of the estimated rate of rotation divided by the square root of the estimated torque;

determining an additional torque converter slip estimate using a coupling region slip estimation process;

comparing the generated slip estimate with the additional torque converter slip estimate; and determining current torque converter slip as the greater of the generated slip estimate and the additional torque converter slip estimate.

7. A method for estimating slip across a torque converter having a driving member coupled to an engine output shaft and a driven member coupled to a transmission input shaft, comprising the steps of:

estimating torque applied to the torque converter;

estimating rate of rotation of the engine output shaft;

modeling a current torque converter performance factor indicating stiffness of the torque converter as a function of the estimated rate of rotation divided by the square root of the estimated torque;

referencing a speed ratio between the driving member and the driven member as a function of the current torque converter performance factor; and generating a slip estimate as a function of the referenced speed ratio and the estimated rate of rotation of the engine output shaft.

8. The method of claim 7, further comprising the steps of:

estimating transmission temperature; and generating a temperature offset as a function of the estimated transmission temperature;

and wherein the modeling step models a current torque converter performance factor indicating stiffness of the torque converter as a function of the generated temperature offset and of the estimated rate of rotation divided by the square root of the estimated torque.

9. A method for estimating slip across a torque converter having a driving member coupled to an engine output shaft and a driven member coupled to an input shaft of a transmission, the transmission having an output shaft coupled to driven wheels of an automotive vehicle, comprising the steps of:

estimating torque applied to the torque converter;

estimating rate of rotation of the engine output shaft;

generating the slip estimate as a function of the estimated rate of rotation divided by the square root of the estimated torque;

calculating current rate of rotation of the transmission input shaft by reducing the rate of rotation of the engine output shaft by the generated slip estimate;

estimating a rate of rotation of the transmission output shaft;

calculating current speed ratio between the transmission input and output shafts as a function of the calculated rate of rotation of the transmission input shaft and the estimated rate of rotation of the transmission output shaft;

comparing the current speed ratio to an expected speed ratio;

identifying when a difference between the current speed ratio and the expected speed ratio indicates a potential powertrain fault condition;

generating a pattern of identified potential powertrain fault conditions;

comparing the generated pattern to at least one stored pattern; and indicating a powertrain fault condition when the generated pattern substantially corresponds to the stored pattern.

10. A method for (a) estimating slip across a torque converter having a driving member coupled to an engine output shaft and a driven member coupled to a transmission input shaft and (b) controlling transmission shift in which transmission gear change responsiveness varies in response to variation in a transmission drive signal, comprising the steps of:

estimating torque applied to the torque converter;

estimating rate of rotation of the engine output shaft;

generating the slip estimate as a function of the estimated rate of rotation divided by the square root of the estimated torque;

identifying when a transmission gear change is in process;

while the transmission gear change is in process, repeatedly (a) calculating current rate of rotation of the transmission input shaft by reducing the rate of rotation of the engine output shaft by the generated slip estimate, (b) estimating a rate of rotation of the transmission output shaft, and (c) calculating speed ratio between the transmission input and output shafts as a function of the calculated rate of rotation of the transmission input shaft and the estimated rate of rotation of the transmission output shaft;

estimating time rate of change in the speed ratio as an indication of transmission gear change responsiveness;

calculating time rate of change error as a difference between the estimated time rate of change and a target time rate of change; and adjusting the transmission drive signal in direction to reduce the time rate of change error toward zero.

11. A method for estimating slip across a torque converter having a driving member coupled to an engine output shaft and a driven member coupled to a transmission input shaft and for controlling engine output torque, comprising the steps of:

estimating torque applied to the torque converter;

estimating rate of rotation of the engine output shaft;

generating the slip estimate as a function of the estimated rate of rotation divided by the square root of the estimated torque;

identifying when a transmission gear change is in process;

while the transmission gear change is in process, repeatedly (a) calculating current rate of rotation of the transmission input shaft by reducing the rate of rotation of the engine output shaft by the generated slip estimate, (b) estimating a rate of rotation of the transmission output shaft, (c) calculating transmission gear ratio as a ratio of the rate of rotation of the transmission input and output shafts, and (d) identifying when the gear ratio is within a predetermined gear ratio range; and reducing engine output torque when the gear ratio is within the predetermined gear ratio range.

12. A method for (a) estimating slip across a torque converter having a driving member coupled to an engine output shaft and a driven member coupled to an input shaft of a transmission having a gear change response that varies with a pressure command applied to the transmission for varying transmission line pressure and (b) for varying the pressure command, comprising the steps of:

estimating torque applied to the torque converter;

estimating rate of rotation of the engine output shaft;

generating the slip estimate as a function of the estimated rate of rotation divided by the square root of the estimated torque;

identifying when a transmission gear change is in process;

while the transmission gear change is in process, repeatedly (a) calculating current rate of rotation of the transmission input shaft by reducing the rate of rotation of the engine output shaft by the generated slip estimate, (b) estimating a rate of rotation of the transmission output shaft, (c) calculating transmission gear ratio as a ratio of the rate of rotation of the transmission input and output shafts, and (d) identifying when the gear ratio is within a predetermined gear ratio range; and varying the pressure command in accordance with a stored pressure change profile when the gear ratio is within the predetermined gear ratio range.

* * * * *